United States Patent [19]

Pultinas, Jr.

[11] 3,855,257

[45] Dec. 17, 1974

[54] PREPARATION OF CARBOXYLIC ACIDS BY THE OXIDATION OF VICINAL GLYCOLS

[75] Inventor: Edmund P. Pultinas, Jr., Cincinnati, Ohio

[73] Assignee: The Proctor & Gamble Company, Cincinnati, Ohio

[22] Filed: June 23, 1971

[21] Appl. No.: 156,053

Related U.S. Application Data

[63] Continuation-in-part of Ser. No. 51,023, June 29, 1970, abandoned.

[52] U.S. Cl. ......... 260/413, 260/515 P, 260/515 R, 260/524 M, 260/524 R, 260/531 R
[51] Int. Cl............................................. C08h 17/36
[58] Field of Search........ 260/413, 515, 531 R, 537, 260/524 M

[56] References Cited
UNITED STATES PATENTS

| 2,373,942 | 4/1945 | Bergsteinsson | 260/635 |
| 2,553,364 | 5/1951 | Fasce | 260/413 |
| 2,808,442 | 10/1957 | Smith et al. | 260/413 X |
| 3,584,038 | 6/1971 | Barone et al. | 260/524 R |
| 3,678,105 | 7/1972 | Croce et al. | 260/524 R |
| 3,711,523 | 1/1973 | Pultinas et al. | 260/413 |

OTHER PUBLICATIONS

De Vries, Tetrahedron Letters, No. 54, pp. 5,689–5,690, (1968).

Mugdan et al., Journ. of the Chem. Soc., 1949, pp. 2,988–3,000.

Primary Examiner—Lewis Gotts
Assistant Examiner—Ethel G. Love
Attorney, Agent, or Firm—William K. Turner; Jack D. Schaeffer; Richard C. Whitte

[57] ABSTRACT

Process for preparing carboxylic acids which comprises reacting vicinal glycols with oxygen in the presence of a catalytic amount of a mixture comprising a tungsten or molybdenum compound and a cobalt compound in a polar, aprotic solvent.

8 Claims, No Drawings

PREPARATION OF CARBOXYLIC ACIDS BY THE OXIDATION OF VICINAL GLYCOLS

CROSS-REFERENCE TO RELATED APPLICATION

This application is a continuation-in-part of copending application, Ser. No. 51,023, filed June 29, 1970, now abandoned.

BACKGROUND OF THE INVENTION

This invention relates to a novel process for the preparation of carboxylic acids from vicinal glycols.

While a variety of processes for the preparation of carboxylic acids have been known and used for many years, there is a continuing need for improved processes therefor. For example, such materials as Grignard reagents and organolithium compounds can be reacted with carbon dioxide to form the corresponding carboxylic acids. However, such processes are expensive and unsuitable for use on a commercial scale and are confined to relatively small-scale laboratory syntheses of carboxylic acids. A primary source of the carboxylic acids in commercial use is the hydrolysis of triglycerides, for example, animal fats. However, the carboxylic acids resulting from such processes are limited to the naturally-occurring monocarboxylic acids having chain lengths most generally in the range of from about 12 to about 20 carbon atoms. Likewise the hydrolysis of plant oils and fats, for example palm oils, peanut oils, and the like, results in the formation of primarily long-chain monocarboxylic acids. Accordingly, the producer of fatty acids by such processes is necessarily limited to the particular fatty acids present in the triglycerides in the natural products used in such processes.

A variety of oxidative processes, such as the air oxidation of paraffins in the presence of manganese salts, have been used extensively on a commercial scale in the preparation of industrial grades of fatty acid mixtures. The controlled oxidation of unsaturated hydrocarbons is an attractive route to carboxylic acids and various methods for achieving controlled oxidation of olefins have been discovered. A variety of reaction products are obtainable therefrom, among which are alcohols, glycols, aldehydes and carboxylic acids.

While it is often desirable to oxidatively convert terminal olefins to their corresponding carboxylic acids, the preparation of a variety of other industrially important chemicals, especially dicarboxylic acids, from internally unsaturated fatty acids present in the triglycerides in natural fats and waxes could be achieved were it possible to oxidize the internal unsaturated linkages present in these unsaturated fatty acids. As is pointed out by MacKenzie, et al., U.S. Pat. No. 2,820,046, the oxidation of these naturally-occurring unsaturated fatty acids at the internal olefinic position is not readily achieved by catalysts suitable for use in the oxidation of terminal olefins. MacKenzie successfully overcame the difficulty in oxidizing internal olefins to carboxylic acids by incorporating in his reaction mixtures a cobalt salt, a portion of 9,10-dihydroxystearic acid and by utilizing propanol as the solvent. The reaction probably proceeds by the formation of an intermediate vicinal glycol.

The use of cobalt salts to oxidatively cleave vicinal glycols to carboxylic acids has also been described by DeVries and Schors, Tetrahedron Letters No. 54, 5689, 1968. These workers were able to oxidize certain glycols to the corresponding carboxylic acids using certain cobalt catalysts and oxygen.

In the process of this invention vicinal glycols are oxidatively cleaved in a polar, aprotic solvent by oxygen in the presence of a mixed catalyst containing both a cobalt compound and a tungsten or molybdenum compound, as hereinafter described. Internal vicinal glycols, especially those formed from unsaturated fatty acids, are not readily oxidized by oxygen in the presence of molybdenum, tungsten or cobalt salts when used singly. However, it has now been discovered that the mixed cobalt-tungsten and cobalt-molybdenum catalyst systems catalyze the oxidative cleavage of both terminal and internal vicinal glycols, even those formed from unsaturated acids. Thus, carboxylic acids are readily prepared from both internal and terminal vicinal glycols by the present process. Furthermore, preparation of dicarboxylic acids by the oxidative cleavage of the vicinal glycol derivatives of carboxylic acids is accomplished by the practice of this invention.

Accordingly, it is a primary and major object of the present invention to provide an improved process for the preparation of carboxylic acids from both terminal and internal vicinal glycols. Another object of the present invention is to provide a process for preparing mono- and di-carboxylic acids by the oxidative cleavage of carboxylic acids containing vicinal glycol substituents. These and other objects are obtained by the present invention as will become apparent from the following disclosure.

SUMMARY OF THE INVENTION

The process of the present invention comprises oxidizing a compound of the formula

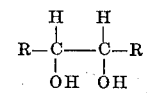

wherein each R is a member selected from the group consisting of hydrogen, alkyl having chain lengths from about 1 to about 30 carbon atoms and preferably from about 5 to about 20 carbon atoms, aryl (e.g., phenyl, naphthyl, and anthracenyl) and $-(CH_2)_n COOM$ wherein n is an integer of from 1 to about 20 and M is hydrogen, alkyl containing from about 1 to about 10 carbon atoms, preferably from about 1 to about 3 carbon atoms or aryl, with oxygen in the presence of a catalytic amount of a mixture of a cobalt (II) compound and a compound selected from the group consisting of peroxidized tungstic acid, peroxidized tungstic oxide, peroxidized molybdic acid and peroxidized molybdic oxide in a polar, aprotic solvent at a temperature of about 30°C to about 300°C.

The general reaction involved in this process is as follows:

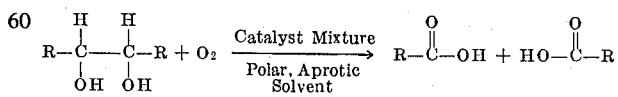

wherein R is as defined above.

The substituted glycols suitable for use in the practice of the present invention can be obtained by a variety of well-known reactions. For example, two moles of aldehyde can be condensed with two moles of sodium in moist ether to afford vicinal glycols suitable for use in the practice of this invention. Another commonly used process affording vicinal glycols suitable for use herein is the hydrolysis of epoxides.

A preferred method for the preparation of vicinal glycols suitable for use in the practice of this invention involves the hydrolysis of vicinal dihalides in amide solvents and is described in U.S. Pat. No. 3,691,218, entitled "Preparation of Vicinal Glycols from Vicinal Dihalides," Ser. Number 51,024, filed June 29, 1970.

Likewise, vicinal glycols prepared by the halogenation of olefins in the presence of water and amides according to the method disclosed in U.S. Pat. No. 3,764,617, entitled "Process for Preparing Haloesters, Halohydrins and Vicinal Glycols," Ser. No. 51,022, filed June 29, 1970, are suitable for use herein.

Still another preferred method for the preparation of vicinal glycols suitable for use in the practice of the present invention involves the direct hydroxylation of unsaturated compounds using a hydrogen peroxide-tungstic acid system, as detailed by Luong and coworkers, J. Am. Oil Chemists Soc., 44, 316–20 (1967). By this process, olefins, unsaturated fatty acids, unsaturated fatty acid esters and like materials, can be converted into derivatives having a vicinal glycol group at the former position of unsaturation by the direct action of hydrogen peroxide in the presence of a tungstic acid or tungstic oxide catalyst.

Preferred catalyst mixtures used in the practice of the present invention include mixtures of peroxidized tungstic acid and cobalt acetate and mixtures of peroxidized molybdic acid and cobalt acetate. Combinations of a variety of peroxidized tungsten and peroxidized molybdenum compounds with cobalt (II) compounds are similarly useful as catalysts in the novel process of the present invention, as is more fully described hereinafter.

As hereinbefore noted, one advantage of the present process is that the oxidation of the vicinal glycol derivatives of a variety of unsaturated acids can be achieved. Since the fatty acids being oxidized contain an internal vicinal glycol group there results a fragmentation of the original unsaturated acid into a mono-acid and a di-acid reaction product. For example, as is described hereinafter, oleic acid can be converted to 9,10-dihydroxystearic acid and then oxidized by the novel process of the present invention to afford the mono-acid fragment, pelargonic acid, and the di-acid fragment, azelaic acid. Likewise, unsaturated acids containing more than one unsaturated linkage can be converted to vicinal glycols, oxidized by the novel process of this invention and fragmented into their corresponding mono- and di-carboxylic acid reaction products. Non-limiting examples of unsaturated acids, the vicinal glycol derivatives of which are suitable for use in the practice of the present invention, include oleic acid, linoleic acid, linolenic acid, eleostearic acid, licanic acid, parinaric acid, ricinoleic acid, palmitoleic acid, petroselinic acid, vaccenic acid, erucic acid and mixtures thereof. Likewise, the esters of these acids, especially the methyl, ethyl and propyl esters, can be converted to the corresponding glycol derivatives and oxidized to acids by the process of this invention. Likewise the natural fats and oils (which are esters of glycerol) are commonly saponified to give mixtures of saturated and unsaturated acids. Such mixtures contain, for example, lauric acid, palmitic acid, and stearic acid together with some or all of the unsaturated acids hereinbefore noted. Such commercially available acid mixtures can be converted to mixtures of vicinal glycols by the methods previously noted and are suitable for use herein. The saturated acids present in such mixtures are not involved in the reaction since, by virtue of their lack of an olefinic linkage, they are not converted to vicinal glycols; the saturated acids can, of course, be removed by standard purification procedures.

Any of the common sources of unsaturated acid mixtures can be used to provide acids the vicinal glycol derivatives of which can be oxidized in accordance with the present invention. Palm oil, coconut oil, babassu oil, lard, tallow, castor oil, olive oil, peanut oil, corn oil, sesame oil, cottonseed oil, soybean oil, sunflower oil, hemp oil, linseed oil, tung oil, oiticica oil, whale oil, Neat's-foot oil and the like, can all be saponified and yield unsaturated acids which can be converted to vicinal glycols which can then be oxidized in the present process.

Exemplary vicinal glycols, other than those formed from unsaturated acids, which can be used in the present invention and which can be prepared from the corresponding olefins include: 1,2-dihydroxypentane, 1,2-dihydroxyhexane, 1,2-dihydroxyheptane, 1,2-dihydroxyoctane, 1,2-dihydroxynonane, 1,2-dihydroxydecane, 1,2-hydroxydodecane, 1,2-dihydroxytetradecane, 1,2-dihydroxypentadecane, 1,2-dihydroxyhexadecane, 1,2-dihydroxyoctadecane, 1,2-dihydroxynonadecane, 1,2-dihydroxyeicosane, 2,3-dihydroxypentane, 2,3-dihydroxyhexane, 2,3-dihydroxyoctane, 2,3-dihydroxydodecane, 2,3-dihydroxytetradecane, 2,3-dihydroxynonadecane, 2,3-dihydroxyeicosane, 4,5-dihydroxydecane, 4,5-dihydroxydodecane, 4,5-dihydroxytridecane, 4,5-dihydroxytetradecane, 5,6-dihydroxypentadecane, 6,7-dihydroxyhexadecane, 6,7-dihydroxyheptadecane, 7,8-dihydroxyoctadecane, 7,8-dihydroxynonadecane, and 9,10-dihydroxyeicosane. Non-limiting examples of cyclic vicinal glycols include: dihydroxycyclopentane, dihydroxycyclohexane, dihydroxycycloheptane, dihydroxycyclooctane, dihydroxycyclononane, dihydroxycyclododecane, dihydroxycyclooctadecane, dihydroxycyclononadecane, and dihydroxycycloeicosane. Non-limiting examples of suitable branched chain vicinal glycols include: 1,5-diphenyl-2,3-dihydroxypentane, 1,10-diisopropyl-5,6-dihydroxydecane, 2-naphthyl-3,4-dihydroxytetradecane, 3-ethyl-7,8-dihydroxyheptadecane, and the like. Both the internal and terminal vicinal glycols are readily converted into their corresponding carboxylic acid fragments by the process of this invention.

Preferred vicinal glycols for use in this invention are: 1,2-dihydroxyoctane, 1,2dihydroxydecane, 1,2-dihydroxydodecane, 1,2-dihydroxytetradecane, 1,2-dihydroxyhexadecane, 1,2-dihydroxyoctadecane, and mixtures thereof. The vicinal glycol derivatives of soybean oil, tallow, lard, corn oil and Neat's-foot oil fatty acid mixtures are also preferred; 9,10-dihydroxystearic acid is especially preferred.

A critical aspect in the practice of the present invention is the catalyst mixture. The preferred process of this invention involves the oxidation of vicinal glycols in the presence of certain mixtures of cobalt and peroxidized tungsten or cobalt and peroxidized molybdenum compounds. Preparation of the vicinal glycols by the processes detailed by Luong, described above, results in the formation of glycolic materials which apparently contain sufficient traces of peroxidized tungsten compounds such that they can readily be oxidized by the subsequent addition of a suitable cobalt salt, air (oxygen) and solvent as hereinafter detailed. That is to say, when glycols prepared by the Luong (tungsten) process are utilized, half of the metal catalyst, to wit, the peroxidized tungsten portion, is already present therein and addition of the cobalt salt then completes the essential catalyst mixture.

Glycols prepared by methods other than those involving catalysis by tungsten compounds are likewise suitable for use in the practice of the present invention. However, oxygen, hydrogen peroxide, and both the tungsten or molybdenum compound and the cobalt compound are then added thereto in order to effect the oxidation of the glycol group.

The tungsten and molybdenum compounds suitable for use in the practice of the present invention are tungstic oxide, tungstic acid, molybdic oxide and molybdic acid, which are "peroxidized," i.e., treated with hydrogen peroxide as hereinafter described. Peroxidized tungstic acid and peroxidized molybdic acid are especially preferred for use as the one component of the catalyst mixture herein. In general, the molybdenum compounds offer cost advantages over the tungsten compounds and are therefore preferred in some cases.

The cobalt salts suitable for use in the catalyst mixture utilized in the practice of this invention are the cobalt (II) salts of organic acids, for example, cobalt (II) acetate, cobalt (II) propionate, cobalt (II) hexanoate, and mixtures thereof. Especially preferred is cobalt (II) acetate. Mixtures of cobalt (II) acetate and cobalt (II) bromide are also preferred for use in this process.

The amount of catalyst present in the system is not critical and can vary over a wide range. For example, the tungsten and molybdenum compounds can be used in amounts ranging from about 0.05% to about 5%, more preferably from about 0.5% to about 2% by weight of the glycol being reacted. The cobalt salt is used in amounts ranging from about 0.01 % to about 10%, more preferably from about 0.05% to about 4%, by weight of glycol being reacted. The ratio of cobalt salt to tungsten or molybdenum compound can range from about 1:20 to 20:1, but this is not critical. It may be desirable to initiate the reaction by using concentrations of 3% to 4% by weight, of the cobaltous compound based on the glycol initially present in the reaction mixture and, thereafter, introduce additional glycol containing from about 0.01% to about 0.5% by weight of the cobaltous compound to said reaction mixture. Thus, the reaction can be initiated almost immediately and then moderated by reducing the total percentage of cobalt compound present in the reaction mixture while maintaining the amount of tungsten or molybdenum compound at the hereinbefore noted concentrations. This procedure is especially useful when performing the reaction at the lower reaction temperatures or when air, rather than pure oxygen, is being used as the oxidant. Likewise, oxidation of sterically hindered glycols is conveniently initiated in this manner.

The tungsten and molybdenum compounds employed in this process are treated with hydrogen peroxide, i.e., "peroxidized," prior to use. When glycols prepared by the method of Luong (noted above) are used herein, a peroxidized tungsten compound is formed during the preparation of the vicinal glycols by hydrogen peroxide oxidation and remains therewith. Such peroxidized tungsten-glycol mixtures can be used herein by simply admixing with the cobalt salt, and the polar, aprotic solvent therewith and passing oxygen or air through the mixture at the reaction temperature as hereinafter disclosed.

When vicinal glycols prepared by methods other than those involving oxidation with hydrogen peroxide using tungsten catalysts are employed in the present oxidation reaction, the tungsten or molybdenum component, i.e., tungstic acid, tungstic oxide, molybdic acid and molybdic oxide, of the catalyst mixture requires pretreatment with hydrogen peroxide. This pre-treatment can be accomplished in either of two ways: in the first, the tungsten or molybdenum compound is treated with about a 2-fold to 50-fold molar excess of an aqueous (70% w/w) hydrogen peroxide solution at 30°C to 80°C, preferably at 45°C to 65°C, for about 1 hour. The resulting slurry of peroxidized tungsten or molybdenum compound is subsequently employed with the cobalt salt, vicinal glycol, solvent and oxygen to effect the oxidation.

In the second method, the vicinal glycol, the tungsten or molybdenum compound and hydrogen peroxide are co-reacted at 30°C to 80°C, as described above, and subsequently reacted with oxygen, in a solvent as herein detailed, in the presence of a cobalt (II) salt.

The solvents suitable for use in the practice of the present invention are those characterized as being polar, aprotic solvents, including such materials as the liquid sulfoxides, sulfones, phosphine oxides and the like. Preferred for use are the liquid N,N-disubstituted amides having the general formula R'C(O)NR''R''', wherein R' is a member selected from the group consisting of hydrogen, normal, branched and cyclic alkyl groups having from about 1 to about 20 carbon atoms, preferably from 1 to about 10 carbon atoms, and phenyl and wherein R'' and R''' are each members selected from the group consisting of normal, branched and cyclic alkyl groups containing from about 1 to about 20 carbon atoms and phenyl.

Non-limiting examples of N,N-disubstituted amides suitable for use as the solvent in the practice of this invention include: dimethylformamide, diethylformamide, dipropylformamide, dibutylformamide, dioxtylformamide, didecylformamide, dimethylacetamide, dimethylpropionamide, dimethylbutyramide, dimethylpentanamide, dimethyloctanamide, dimethyldecanamide, diethylacetamide, dipropylpropionamide, dibutylbutyramide, dipropylbutyramide, dioctyldecanamide, didecyldecanamide, diphenylacetamide, diphenylbenzamide, dimethyleicosanamide, didecylhexadecanamide, di-eicosyleicosanamide and methylphenylacetamide. Any of these amides can be prepared by the condensation of the corresponding acid or acid halide with the corresponding dialkyl or diaryl amine in the manner well-known to those skilled in the art. Certain tetraalkyldiamides can be suitably employed as the solvent in the practice of the novel process of this invention. For example, N,N,N',N'-tetraalkyldiamides of oxalic acid, wherein the alkyl groups are those hereinbefore noted as suitable for use in the mono-amide materials useful as solvents in this invention, can be employed. Sufficient solvent is used to dissolve the reactants.

Especially preferred polar, aprotic solvents for use in the practice of this invention are dimethylformamide and dimethylacetamide.

The oxidation reaction of the present invention is exothermic and, hence, the reaction mixture will warm spontaneously to some ultimate temperature which depends on the molar concentration of reactants, the rate of addition of oxygen or air, the boiling point of the solvent, etc. Should the reaction become excessively vigorous, it can be moderated by cooling. The reaction temperature is not critical and temperatures from about 30°C to 300°C can be employed. Since the reaction mixture contains peroxides, which are potentially subject to thermal decomposition, reaction temperatures from about 30°C to 150°C, more preferably from about 70°C to 100°C, are generally used in the practice of this invention.

The following Examples illustrate the practice of this invention but are not intended to be limiting thereof.

Oxidation of Vicinal Glycols to Carboxylic Acids

In the following Examples the Acid Value (AV) of the reaction mixture is used as a measure of the completeness of the oxidation of the vicinal glycol to the carboxylic acids. The Acid Value is the number of milligrams of potassium hydroxide necessary to neutralize the fatty acids in a one-gram sample. Acid Value measurements are commonly used for this purpose and are described in the American Oil Chemists Society Method Te 1a-64 T.

For purposes of illustration, the following example shows how Acid Values are used as a measure of the completeness of the conversion of 9,10-dihydroxystearic acid to a mixture of azelaic acid and pelargonic acid. As a representative example, a solution of 94.92 parts solvent (such as dimethylacetamide), 31.64 parts of 9,10-dihydroxystearic acid and 1.26 parts of cobalt (II) acetate is prepared. The Acid Value of the mixture is $$177 \times (31.64/127.82) = 43.7 \approx 44$$

(177 is the AV of 9,10 -dihydroxystearic acid).

Assuming complete conversion 9,10-dihydroxystearic acid to azelaic acid and pelargonic acid, the AV of the resulting mixture is $$486 \times (34.64/130.82) = 128$$

(486 is the AV of an equimolar mixture of azelaic acid and pelargonic acid).

Calculation of the percent conversion of dihydroxystearic acid to a mixture of azelaic acid and pelargonic acid is determined by the formula $$[(AV \text{ of Mixture}) - 44 \times 100]/128 - 44 = \% \text{ conversion}$$

It should be noted that this method is approximate in that it assumes that pure 9,10-dihydroxystearic acid is being used in the oxidation process. Most samples of 9,10-dihydroxystearic acid are contaminated with small amounts of stearic and other acids which lowers the true Acid Values of the starting materials and final mixtures.

EXAMPLE I

Oxidation of 9,10-dihydroxystearic Acid in the Presence of Cobalt Acetate, and Hydrogen Peroxide-Treated Tungstic Acid Two grams of tungstic acid were stirred for 3 hours at 35°–50°C with 50 ml. of 70% (wt./wt.) hydrogen peroxide. The solution turned from yellow to a cloudy-white or gray color. On standing overnight, a small amount of gray-white powder settled out of the reaction mixture.

Ten grams of 9,10-dihydroxystearic acid, 30 ml. of dimethylacetamide and 0.3 g. cobalt acetate were placed in a 100 ml. flask and oxygen flow through the mixture was initiated. The slurry of tungstic acid and hydrogen peroxide as prepared above was added portionwise to the reaction mixture over a 4-hour period. The reaction temperature rose to a maximum of about 100°C. The initial AV of the reaction mixture (46) rose to 106 after 4.5 hours' reaction. An Acid Value of 128 indicates complete conversion of 9,10-dihydroxystearic acid to pelargonic acid and azelaic acid.

An equivalent amount of 1,2-dihydroxyoctane, 1,2-dihydroxydecane, 1,2-dihydroxydodecane, 1,2-dihydroxytetradecane, 1,2-dihydroxyhexadecane, and 1,2-dihydroxyoctadecane, respectively, is substituted for the 9,10-dihydroxystearic acid and oxidized to acids in like fashion.

An equivalent amount of vicinally hydroxylated soybean oil, tallow, lard, Neat's-foot oil and corn oil fatty acid mixtures are substituted for the 9,10-dihydroxystearic acid and the reaction is run at 30°C and 110°C, respectively, with substantially the same results.

The dimethylacetamide is replaced with an equivalent amount of dimethylformamide, dimethylbutyramide, dipropylbenzamide, dibenzylbenzamide and didecyldecanamide, respectively, and the same results are obtained in that the vicinal glycol is oxidized.

EXAMPLE II

Oxidation of a Vicinal Glycol Derivative of a Fatty Acid Mixture

To a mixture of 290 g. of a tallow fatty acid mixture having an average molecular weight of 282, 3.66 g. of 9,10-dihydroxystearic acid and 2.17 g. of tungstic acid was added 70 g. of a 70% solution (w/w) of hydrogen peroxide in a dropwise fashion so that the reaction temperature was maintained at about 65°C. Following the addition of hydrogen peroxide, the reaction mixture was heated at 65°C for about 4 hours and then stirred for an additional 1 hour. The reaction mixture was worked up by removal of the water, stirring for one hour with 1.45 liters of ethyl acetate and removing the solids by filtration at 35°C. The solids were centrifuged at 35°C and the resulting compound, which proved to be 9,10-dihydroxystearic acid, recovered from the ethyl acetate.

To 130 g. of the 9,10-dihydroxystearic acid prepared in this fashion was added 1,500 ml. of dimethylacetamide (dried over sodium sulfate) and 5.73 g. of cobalt (II) acetate.4 $H_2O$. Oxygen was bubbled through the reaction mixture which was dark purple initially and the temperature rose to about 100°C; thereafter the reaction mixture turned dark green. Oxygen flow (about 500 ml./min.) was maintained for about 200 minutes following which the reaction mixture was quenched in a cold water bath. Following removal of the dimethylacetamide by evaporation, the pelargonic acid formed in the reaction was recovered by distillation and the azelaic acid was purified by recrystallization.

In an alterante process, air is bubbled through the reaction mixture instead of oxygen while the temperature of the reaction mixture is maintained at about 70°C with external heating. The reaction exhibits an induction period of about two hours, after which the reaction proceeds in the usual fashion to yield a mixture of azelaic and pelargonic acids.

The reaction is run in dimethylformamide and diethylacetamide, respectively, at 30°C, 70°C and 150°C with equivalent results.

EXAMPLE III

Oxidation of 1,2-Dihydroxydodecane

A mixture of 35 g. of 1,2-dihydroxydodecane, 8.4 g. hydrogen peroxide (70% w/w) and 0.26 g. tungstic acid was heated at 55°–60°C for 2.75 hours. Following this pretreatment, excess water was added to the reaction mixture which was then cooled to about 0°C and filtered. The solid product was air dried.

A reaction mixture consisting of 20 g. of the 1,2-dihydroxydodecane pretreated with tungstic acid and peroxide as described above, 70 g. dimethylacetamide solvent and 0.6 g. cobalt (II) acetate.4H$_2$O were placed together in a reaction vessel and oxygen bubbled through the mixture. The reaction mixture was maintained at 100°C during the addition of oxygen. The oxygen flow rate was about 500 ml./min. The heating and addition of oxygen was carried on for a period of 5.25 hours. The AV rose from an initial value of 8 to a final value of 48.

The reaction was repeated using 50 g. 1,2-dihydroxydodecane, 12.0 g. hydrogen peroxide (70% w/w) and 0.38 g. tungstic acid in the pre-treatment process. Following pretreatment of the 1,2-dihydroxydodecane, which was carried out at 55°–60°C as hereinbefore described, 25.0 g. of the pre-treated 1,2-dihydroxydodecane was dissolved in 75 g. of dimethylacetamide at 100°C and 0.75 g. of cobalt (II) acetate.4H$_2$O was added to the reaction mixture. The oxygen flow rate was maintained at 500 ml./min. After 10.08 hours the AV was 95, indicating good conversion to the acid.

An equivalent amount of dihydroxycyclononane is substituted for the 1,2-dihydroxydodecane and equivalent results are obtained in that azelaic acid is formed.

The tungstic acid is replaced with tungstic oxide, molybdic acid and molybdic oxide, respectively, and the reaction run at 100°C, 120°C and 300°C, respectively, using air, instead of oxygen, with equivalent results.

EXAMPLE IV

A mixture of 4 pounds of a soybean oil fatty acid hydrolysate, 4 ounces of 9,10-dihydroxystearic acid, 0.04 pounds of tungstic oxide and 1.2 pounds of 70% (w/w) hydrogen peroxide are charged in a glass-lined steel kettle and stirred together at 45°C for 30 minutes, then heated at 75°C for 2 hours. Excess water is added and the resulting slurry extracted by stirring with 2 gallons of ethyl acetate for 2 hours and the solvent removed. The resulting glycolic compounds are admixed with three ounces of cobalt (II) propionate, one gallon of diethylpropionamide is added and the mixture heated, with stirring, at 100°C while a constant stream of air is bubbled through the reaction mixture for four hours.

Subsequent removal of the solvent by evaporation yields a mixture of acids, of which the major portion is azelaic acid, caproic acid and pelargonic acid.

Neat's-foot oil, lard and tallow fatty acid mixtures, respectively, are substituted for the soybean oil acid mixture, the reaction is run in dimethylacetamide at 100°C and equivalent results are obtained.

Oxygen is substituted for the air and cobalt (II) butyrate is used as the cobaltous catalyst with equivalent results. The tungstic oxide is replaced by an equivalent amount of molybdic oxide and molybdic acid, respectively, and equivalent results are secured.

EXAMPLE V

A slurry of 2 g. of tungstic acid in 25 ml. of 70% (w/w) H$_2$O$_2$ is heated at 60°C for 20 minutes.

0.1 mole of 2,3-dihydroxydecane is dissolved in 50 ml. of dipropylacetamide and 0.1 g. of cobalt (II) decanoate is added thereto. The peroxidized tungstic acid slurry is added, portionwise, to the reaction mixture over a 4-hour period at 125°C while a stream of oxygen is maintained through the mixture. Workup in the previously detailed manner yields acetic acid and octanoic acid.

In the above reaction the dipropylacetamide is replaced by an equivalent amount of dimethylacetamide, dibutyldodecanamide, diethylbenzamide, diphenylacetamide, dodecylmethylbenzamide and diethylacetamide, respectively. The same results are obtained in that 2,3-dihydroxydecane is oxidized to acetic acid and octanoic acid.

The 2,3-dihydroxydecane is replaced with 1,2-dihydroxyoctane and 1,2-dihydroxydecane, respectively, and the reaction run at 120°C. The corresponding monocarboxylic acids and formic acid are formed.

The tungstic acid is replaced by an equivalent amount of molybdic acid and molybdic oxide, respectively, and equivalent results are secured.

EXAMPLE VI

Oxidation of the Vicinal Glycol Derivatives of Short-Chain Carboxylic Acids 0.1 mole of 3,4-dihydroxyoctanoic acid is dissolved in 50 ml. of dimethylacetamide and 0.1 g. of cobalt (II) acetate is added thereto.

A slurry of 2 g. of tungstic oxide in 25 ml. of 70% (w/w) H$_2$O$_2$ is heated at 60°C for 30 minutes and subsequently added portionwise to the reaction mixture containing the 2,3-dihydroxyoctanoic acid. Concurrently with the addition of the tungstic oxide-hydrogen peroxide, oxygen is bubbled through the reaction mixture. The addition of the tungstic oxide-hydrogen peroxide is maintained at a rate so that the reaction temperature stays at about 80°C. After all of the tungstic oxide-peroxide slurry is added, oxygen is passed through the reaction mixture for an additional 30 minutes; the reaction mixture is then worked up in the previously detailed manner and yields a mixture of malonic acid and hexanoic acid.

The 2,3-dihydroxyoctanoic acid is replaced by an equivalent amount of 2,3-dihydroxyhexanoic acid, 2,3-dihydroxypentanoic acid, 3,4-dihydroxynonanoic acid, 3,4-dihydroxyheptanoic acid, 3,4-dihydroxymethyloctanoate, 3,4-dihydroxypropyldecanoate, and 3,4-dihydroxyphenylpentanoate, respectively. Equivalent results are obtained in that the dihydroxy acids and dihydroxy acid esters are cleaved to their corresponding mono- and di-carboxylic acid fragments.

The reaction is carried out at 70°C and 150°C, respectively, in dimethylpropionamide using a catalyst comprising 1 gram of molybdic acid, 2 grams of cobalt (II) acetate and 2 grams of cobalt (II) bromide with substantially the same results.

EXAMPLE VII and

Molybdic Oxide Catalyzed Oxidation of 9,10-Dihydroxystearic Acid 200 grams of tallow fatty acids, 0.6 grams molybdic oxide and 6.3 grams of 9,10-dihydroxystearic acid were heated to 70°C. 24.3 grams of 70% hydrogen peroxide were added and the mixture was heated for 105 minutes. Conversion of the oleic acid (present in the tallow acid) to 9,10-dihydroxystearic acid and minor amounts of cleavage products was complete in this time. 1,000 grams of hexane were added to the reaction mixture an allowed to stir at room temperature for 1 ½ hours. 89 grams of precipitated dihydroxystearic acid were recovered from the mixture.

20 grams of the above dihydroxystearic acid-peroxidized molybdic oxide mixture were added to 60 grams of N,N-dimethylacetamide and 1.2 grams of cobalt acetate tetrahydrate. Oxygen was added at a rate of ~ 500 ml/minute at 100°C for 6 ¾ hours. Acid value measurements indicated a yield of ~90% of azelaic and pelargonic acids.

In the above procedure the molybdic oxide is replaced with an equivalent amount of molybdic acid and equivalent results are secured.

What is claimed is:

1. A process for preparing carboxylic acids comprising oxidizing an internal vicinal glycol in the presence of a catalytic amount of a mixture comprising a cobalt (II) salt of an organic acid and a compound selected from the group consisting of peroxidized tungstic acid, peroxidized tungstic oxide, peroxidized molybdic acid and peroxidized molybdic oxide in a polar, aprotic solvent.

2. A process according to claim 1 wherein the polar, aprotic solvent is an N,N-disubstituted amide of the formula R'C(O)NR''R''', wherein R' is an alkyl group having from about 1 to about 20 carbon atoms, or phenyl, and wherein R'' and R''' are each alkyl groups having from about 1 to about 20 carbon atoms or phenyl.

3. A process according to claim 1 wherein the polar, aprotic solvent is selected from the group consisting of dimethylacetamide and dimethylformamide.

4. A process according to claim 1 wherein the internal vicinal glycol is derived from naturally-occurring glyceride acids.

5. A process according to claim 1 wherein the vicinal glycol is 9,10-dihydroxystearic acid.

6. A process according to claim 1 wherein the catalyst is a mixture of an organic acid salt of cobalt (II) and a member selected from the group consisting of peroxidized tungstic acid and peroxidized molybdic acid prepared by treating tungstic acid or molybdic acid with a 2-fold to 50-fold molar excess of hydrogen peroxide at 30°C to 80°C for about 1 hour.

7. A process according to claim 1 wherein the catalyst is a mixture of an organic acid salt of cobalt (II) and a compound selected from the group consisting of peroxidized tungstic acid and peroxidized molybdic acid prepared by maintaining a mixture of the tungstic acid or molybdic acid, vicinal glycol and a 2-fold to 50-fold molar excess of hydrogen peroxide at 30°C to 80°C for about 1 hour.

8. A process for preparing carboxylic acids according to claim 1 wherein said catalytic mixture comprises from about 0.05% to 5.0% of a compound selected from the group consisting of peroxidized tungstic acid, peroxidized tungstic oxide, peroxidized molybdic acid and peroxidized molybdic oxide, based on the weight of said vicinal glycol, and from 0.01% to 10%, based on the weight of said vicinal glycol, of an organic acid salt of cobalt (II) in a solvent selected from the group consisting of dimethylformamide and dimethylacetamide; and wherein said process is carried out at a temperature from 30°C to 300°C.

* * * * *